United States Patent [19]

Ayers et al.

[11] 4,264,450
[45] Apr. 28, 1981

[54] FIBROUS DISC OIL SKIMMER

[75] Inventors: Ray R. Ayers, Houston; Kenneth L. Bickham, Spring, both of Tex.

[73] Assignee: Shell Oil Company, Houston, Tex.

[21] Appl. No.: 106,125

[22] Filed: Dec. 21, 1979

[51] Int. Cl.³ .............................................. E02B 15/04
[52] U.S. Cl. .................................. 210/671; 210/693; 210/242.4
[58] Field of Search .................. 210/30 A, 40, 242 S, 210/242 AS, DIG. 25, DIG. 26, 36

[56] References Cited

U.S. PATENT DOCUMENTS

| | | | |
|---|---|---|---|
| 3,578,585 | 5/1971 | Yahnke | 210/30 A |
| 3,617,555 | 11/1971 | Ginsburgh et al. | 210/30 A |
| 3,667,235 | 6/1972 | Preus et al. | 210/242 AS |
| 4,142,972 | 3/1979 | Nebeker et al. | 210/DIG. 25 |
| 4,172,036 | 10/1979 | Morris | 210/DIG. 26 |

Primary Examiner—Ivars C. Cintins

[57] ABSTRACT

A method and apparatus are provided for removing oil from the surface of water by means of one or a multiplicity of discs which are provided with either or a combination of oil-absorbent bristles and oil-absorbent materials disposed on the flat surfaces of the disc, the disc being disposed partially in the oil and partially in a vapor space thereabove, rotating the discs to cycle the bristles and/or oil-absorbent material alternately from the oil on the water to the vapor space thereabove, allowing the oil to adhere or absorb into the bristles or absorbent material and then removing the oil from the bristles and/or oil-absorbent material while the bristles and/or oil-absorbent material are in the vapor space.

30 Claims, 2 Drawing Figures

FIBROUS DISC OIL SKIMMER

BACKGROUND OF THE INVENTION

The prior art discloses numerous devices useful for removing oil from the surface of water. These include various drums and belts which are partially submerged in the water and revolved. Oil attaches to such surfaces, after which it is removed to storage, thus recovering oil from the surface of the water. Typical of such devices is that disclosed in U.S. Pat. Nos. 3,671,555 and 3,968,041. While these devices may operate suitably, the effective surface area of the belts and/or drums is somewhat limited, which in turn, limits the amount of oil which can be removed from the water's surface in a given length of time.

Other art considered pertinent to the present invention includes U.S. Pat. Nos. 387,399; 655,045; 3,539,048 and 3,640,394.

SUMMARY OF THE INVENTION

The present invention pertains to a method and apparatus for removing oil from water by means of a standard disc having special oil-adsorbent and/or oil-absorbent material attached.

More particularly, at least part of the disc contacts the oil on the water, with the remaining part of the disc extending into the vapor space above the oil, and the disc is rotated to cycle the sorbent material on the disc alternately from the oil on the water to the vapor space thereabove, and finally removing the oil from the sorbent material while said material is in the vapor space.

In accordance with a preferred embodiment, the disc is substantially circular and flat, and adsorbent bristles and/or absorbent material also of flat disc configuration are attached to the surfaces of the disc.

In accordance with an even more preferred embodiment of the present invention, multiple discs are rotated about a common axis and are disposed to remove oil to an adjacent storage enclosure from which oil is continuously or periodically removed by suction. The enclosure has a flexible curtain terminating in weights extending downwardly from the enclosure to permit oil to accumulate to a substantial depth.

DESCRIPTION OF PREFERRED EMBODIMENTS

Figure 1:
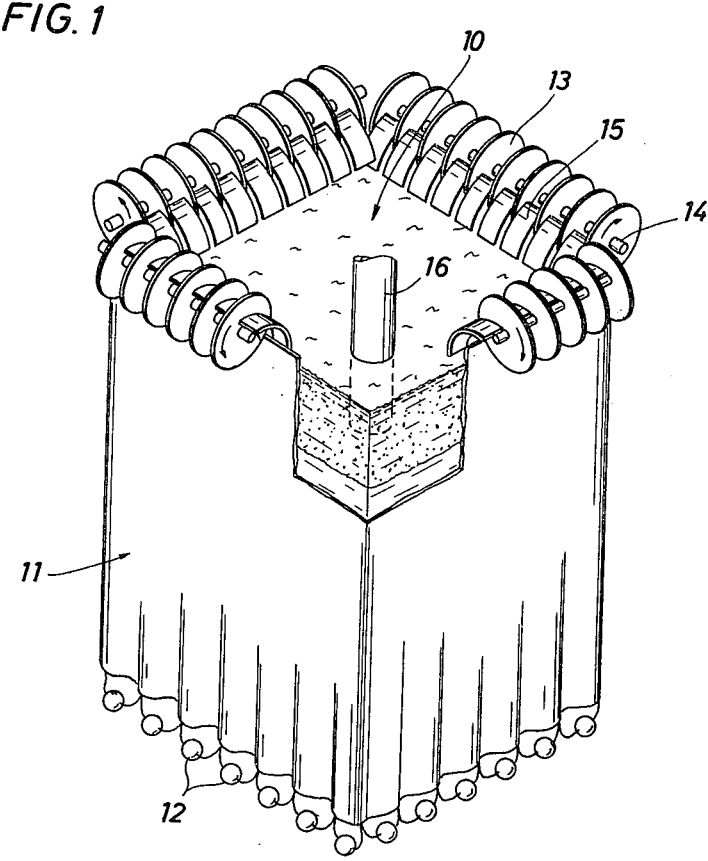
FIG. 1 is a schematic of a sorbent disc skimmer with integral storage.

FIG. 1 discloses an enclosure 10 which may be in the form of an open ended box, as shown, or other configuration, which extends downwardly into an oil layer disposed on a water layer so that the oil layer is enclosed on all sides. The enclosure 10 may terminate in a curtain 11 held down by weights 12 so as to prevent currents within container 10. Disposed about container 10 are discs 13 which rotate about a common axis 14. Either one disc or many discs rotating about a common axis or several common axes may be provided as shown. The discs are preferably rotated so that the top parts of the discs are rotating in a direction away from enclosure 10 while the bottom parts of the discs are rotating toward enclosure 10. This serves to draw oil around the disc toward the enclosure. Compressing wiper means 15 removes the oil from the discs and directs the oil into enclosure 10. Oil suction means 16 removes the oil from enclosure 10 and transfers it to storage means, not shown. Conventional wiper blades or rollers may be utilized for removal of oil from the adsorbent/absorbent discs.

Figure 2:
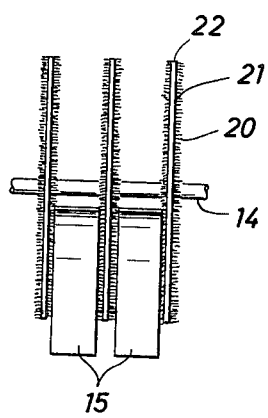
FIG. 2 shows details of the adsorbent/absorbent disc.

FIG. 2 discloses the disc of the invention in detail. Bristles 20 extend therefrom and are preferably oil-wetable, durable, flexible and of sufficient length and sufficient numbers so that they provide a large surface area to which the oil can adhere. Each bristle 20 has a diameter ranging between about 0.005 and about 0.100 inches, and a length ranging from about 0.25 to 2 inches. The number of bristles per square inch of disc surface area ranges between about 10 and about 5000 so that a disc having 1 inch long bristles of 0.013 inch diameter and 2500 bristles per square inch will provide an oil-wetable surface of 1.33 square inches per square inch of disc. But more important than the surface area itself is the open area between adjacent bristles that holds large volumes of oil by the mechanism of bridging between adjacent surfaces.

Bristles 20 may be synthetic fibers embedded in a resinous backing material which in turn is attached to the disc 22 which is of rigid construction. The bristles 20 are spread uniformly across the backing material 21 to provide better brushing action, longer life and better cleanability. Suitable bristle materials are nylon, polyesters and polyamids, and suitable rigid disc materials are metals or plastics or any sheet or plate-like structural material that would maintain its shape during oil recovery operations. The backing material 21 may be absorbent material such as polypropylene felt or reticulated polyurethane foam. A mesh net of polyester-nylon may be employed to hold the felt in place. An absorbent backing material may be employed in the absence of bristles 20 and in such case, a roller means is employed in place of the wiper means 15 to remove the oil from the absorbent 21.

Mechanical driving means, not shown, are utilized to drive the axes about which the discs rotate. The entire skimmer apparatus of the present invention can be deployable from the air and requires no operator. It may be allowed to remain in place and continuously collect oil from an oil slick until such time as a vessel reaches the skimmer and removes the oil therefrom to storage aboard the vessel.

Such a skimmer is useful when water currents are low or when the skimmer is used in a containment boom which is allowed to drift at the current's speed, e.g., using sea anchors. The following example demonstrates the increased efficiency of the present invention.

EXAMPLE

A 2-foot diameter smooth aluminum disc was revolved at 20 revolutions per minute with the upper half of the disc in air and the lower half of the disc in an oil. Oil adhering to the disc was removed continuously from the part of the disc in the air space. Using this technique, 0.4 gallons per minute of No. 2 fuel oil (viscosity 4 centistokes at 70° F.) and 4.7 gallons per minute of lube oil (viscosity 700 centistokes at 70° F.) were removed.

An artificial turf of nylon bristles on a backing of open-weave nylon-polyester fabric (139 bristles per square centimeter, each bristle measuring 0.001 centimeter thick by 0.0118 centimeter wide by 1.1 centimeters long) was applied to the above aluminum disc, and the oil removal technique was otherwise duplicated. With the artificial turf in place, 3.0 gallons per minute of the No. 2 fuel oil and 11.3 gallons per minute of the lube oil now were removed from the disc. This represented an increased oil recovery over the smooth disc without the artificial turf of 750% for the No. 2 fuel oil and 240% for the lube oil.

I claim as my invention:

1. A method for removing oil from the surface of water comprising, providing a disc having oil-wetable bristles, disposing the disc into contact with the oil on the water, at least part of the disc being in a vapor space above the oil on the water, rotating the disc to cycle the bristles alternately from the oil on the water to the vapor space, allowing the oil to adhere to the bristles, and removing the oil from the bristles while the bristles are in the vapor space.

2. The method of claim 1 wherein a wiper blade is utilized to remove the oil from the bristles.

3. The method of claim 1 wherein the disc is substantially circular and flat and the bristles extend outwardly from the flat surfaces of the disc.

4. The method of claim 1 wherein the disc is disposed substantially vertically into the oil on the water.

5. The method of claim 1 wherein multiple discs are rotated about a common axis.

6. The method of claim 1 wherein the oil from the disc is removed to an adjacent enclosure containing a thickened oil layer and oil is continuously, or periodically, removed by suction from the enclosure.

7. The method of claim 6 wherein a flexible curtain terminating in weights extends downwardly from the enclosure to form an open-ended box.

8. A method for removing oil from the surface of water comprising, providing a disc having a layer of oilabsorbent material, disposing the disc into contact with the oil on the water, at least part of the disc being in a vapor space above the oil on the water, rotating the disc to cycle each part of the oil-absorbent material alternately from the oil on the water to the vapor space, allowing the oil to be absorbed by the absorbent material, and removing the oil from the absorbent material while the absorbent material is in the vapor space.

9. The method of claim 8 wherein a roller is utilized to remove the oil from the absorbent material.

10. The method of claim 8 wherein the disc is substantially circular and flat and the absorbent material is arranged on the flat surfaces of the disc.

11. The method of claim 8 wherein the disc is disposed substantially vertically into the oil on the water.

12. The method of claim 8 wherein multiple discs are rotated about a common axis.

13. The method of claim 8 wherein the oil from the disc is removed to an adjacent enclosure containing a thickened oil layer and oil is continuously or periodically removed by suction from the enclosure.

14. The method of claim 13 wherein a flexible curtain terminating in weights extends downwardly from the enclosure.

15. The method of claim 8 wherein oil-adsorbent bristles extend outwardly from the oil-absorbent material.

16. Apparatus for removing oil from the surface of water comprising, a disc having oil-wetable bristles, a lower part of the disc being in the oil on the water and an upper part of the disc being in a vapor space above the oil on the water, means for rotating the disc to cycle the bristles alternately from the oil on the water to the vapor space, and means for removing the oil from the bristles while the bristles are in the vapor space.

17. The apparatus of claim 16 wherein the disc is substantially circular and flat and the bristles extend outwardly from the flat surfaces of the disc.

18. The apparatus of claim 16 wherein the disc is disposed substantially vertically into the oil on the water.

19. The method of claim 16 wherein a wiper blade is operatively associated with the disc for removing the oil from the bristles.

20. The apparatus of claim 16 wherein multiple discs are provided with means for rotating the disc about a common axis.

21. The apparatus of claim 16 wherein means is provided for removing the oil from the disc to an adjacent enclosure containing a thickened oil layer, and suction means is provided for continuously or periodically removing oil from the enclosure.

22. The apparatus of claim 21 wherein a flexible curtain terminating in weights extends downwardly from the enclosure to form an open-ended box.

23. An apparatus for removing oil from the surface of water comprising, a disc having an oil-absorbent material thereon, part of the disc being disposed in a vapor space above the oil on the water and part of the disc being disposed in the oil on the water, means for rotating the disc to cycle each part of the oil-absorbent material alternately from the oil on the water to the vapor space thereabove, and means for removing the oil from the oil-absorbent material while the oil-absorbent material is in the vapor space.

24. The apparatus of claim 23 wherein a roller is operatively associated with the disc for removing oil from the oil-absorbent material.

25. The apparatus of claim 23 wherein the disc is substantially circular and flat and the oil-absorbent material is arranged on the flat surfaces of the disc.

26. The apparatus of claim 23 wherein the disc is disposed substantially vertically into the oil on the water.

27. The apparatus of claim 23 wherein means is provided to rotate multiple discs about a common axis.

28. The apparatus of claim 23 wherein means is provided for removing the oil from the disc to an adjacent enclosure containing a thickened oil layer, and suction means is provided to continuously or periodically remove oil from the enclosure.

29. The apparatus of claim 28 wherein a flexible curtain terminating in weights extends downwardly from the enclosure.

30. The apparatus of claim 23 wherein oil-adsorbent bristles extend outwardly from the surface of the oil-absorbent material.

* * * * *